(12) United States Patent
Goering et al.

(10) Patent No.: US 8,073,599 B2
(45) Date of Patent: Dec. 6, 2011

(54) CONVEYING DUCT MONITOR SYSTEM FOR CONTROLLING HARVESTER SPEED

(75) Inventors: Kevin Jacob Goering, Cambridge, IA (US); Philip Eugene Ferree, Ankeny, IA (US); Alan Lee Dzubak, Johnston, IA (US)

(73) Assignee: Deere & Company, Moline, IL (US)

( * ) Notice: Subject to any disclaimer, the term of this patent is extended or adjusted under 35 U.S.C. 154(b) by 702 days.

(21) Appl. No.: 11/778,395

(22) Filed: Jul. 16, 2007

(65) Prior Publication Data

US 2007/0299591 A1 Dec. 27, 2007

Related U.S. Application Data

(63) Continuation-in-part of application No. 10/887,963, filed on Jul. 9, 2004, now Pat. No. 7,249,449.

(51) Int. Cl.
*G06F 7/70* (2006.01)
*G06F 19/00* (2006.01)
*G06G 7/00* (2006.01)
*G06G 7/76* (2006.01)
*A01B 63/10* (2006.01)
*A01D 41/127* (2006.01)
*A01D 89/00* (2006.01)

(52) U.S. Cl. ...................... 701/50; 56/10.2 G

(58) Field of Classification Search ............ 701/50
See application file for complete search history.

(56) References Cited

U.S. PATENT DOCUMENTS

| | | |
|---|---|---|
| 2,698,929 A | 1/1955 | Greacen, 3rd et al. |
| 3,863,428 A | 2/1975 | Baxter |
| 4,068,223 A | 1/1978 | Steffen |
| 4,458,471 A | 7/1984 | Herwig |
| 4,487,002 A | 12/1984 | Kruse et al. |
| 4,606,177 A | 8/1986 | Schlueter |
| 4,635,047 A | 1/1987 | Fox et al. |
| 4,961,304 A | 10/1990 | Ovsborn et al. |
| 5,025,614 A | 6/1991 | Orsborn et al. |
| 5,063,729 A | 11/1991 | Fox et al. |
| 5,392,495 A | 2/1995 | Horn |
| 5,490,372 A | 2/1996 | Schlueter |
| 5,832,708 A | 11/1998 | Sugden |
| 5,920,018 A | 7/1999 | Wilkerson et al. |
| 6,068,059 A * | 5/2000 | Bajema et al. ............... 171/130 |
| 6,321,516 B1 | 11/2001 | Wigdahl et al. |
| 6,363,700 B1 | 4/2002 | Fowler |
| 6,421,991 B1 | 7/2002 | Goering et al. |
| 6,431,981 B1 | 8/2002 | Shinners et al. |
| 6,546,709 B2 | 4/2003 | Goering et al. |

(Continued)

OTHER PUBLICATIONS

Samuel Jackson Microwave Bale Sensors, Internet—dated Jul. 13, 2007 (printed).

*Primary Examiner* — Tuan C To
*Assistant Examiner* — Imran Mustafa

(57) ABSTRACT

Sensing structure including a microwave sensor monitors the velocity, mass flow and moisture of cotton in a harvester air duct. As the flow of cotton in the air duct nears maximum capacity, the cotton velocity will decrease and the sensor provides a signal to the controller so that harvester speed will be reduced. Cotton mass and moisture level signals are used to determine the percentage capacity and anticipate loading of the cotton cleaner or other crop processor. The signals can also be used to control cross auger and impeller speed to even out the flow of cotton within the air duct system in highly variable yield conditions in the field.

18 Claims, 2 Drawing Sheets

U.S. PATENT DOCUMENTS

| | | | |
|---|---|---|---|
| 6,584,390 B2 * | 6/2003 | Beck | 701/50 |
| 6,606,571 B2 | 8/2003 | Phelan et al. | |
| 2001/0017589 A1 * | 8/2001 | Lemke | 340/673 |
| 2001/0054903 A1 * | 12/2001 | Adams et al. | 324/667 |
| 2003/0019196 A1 * | 1/2003 | Coers et al. | 56/10.2 G |
| 2003/0217538 A1 * | 11/2003 | Pirro | 56/16.4 A |

* cited by examiner

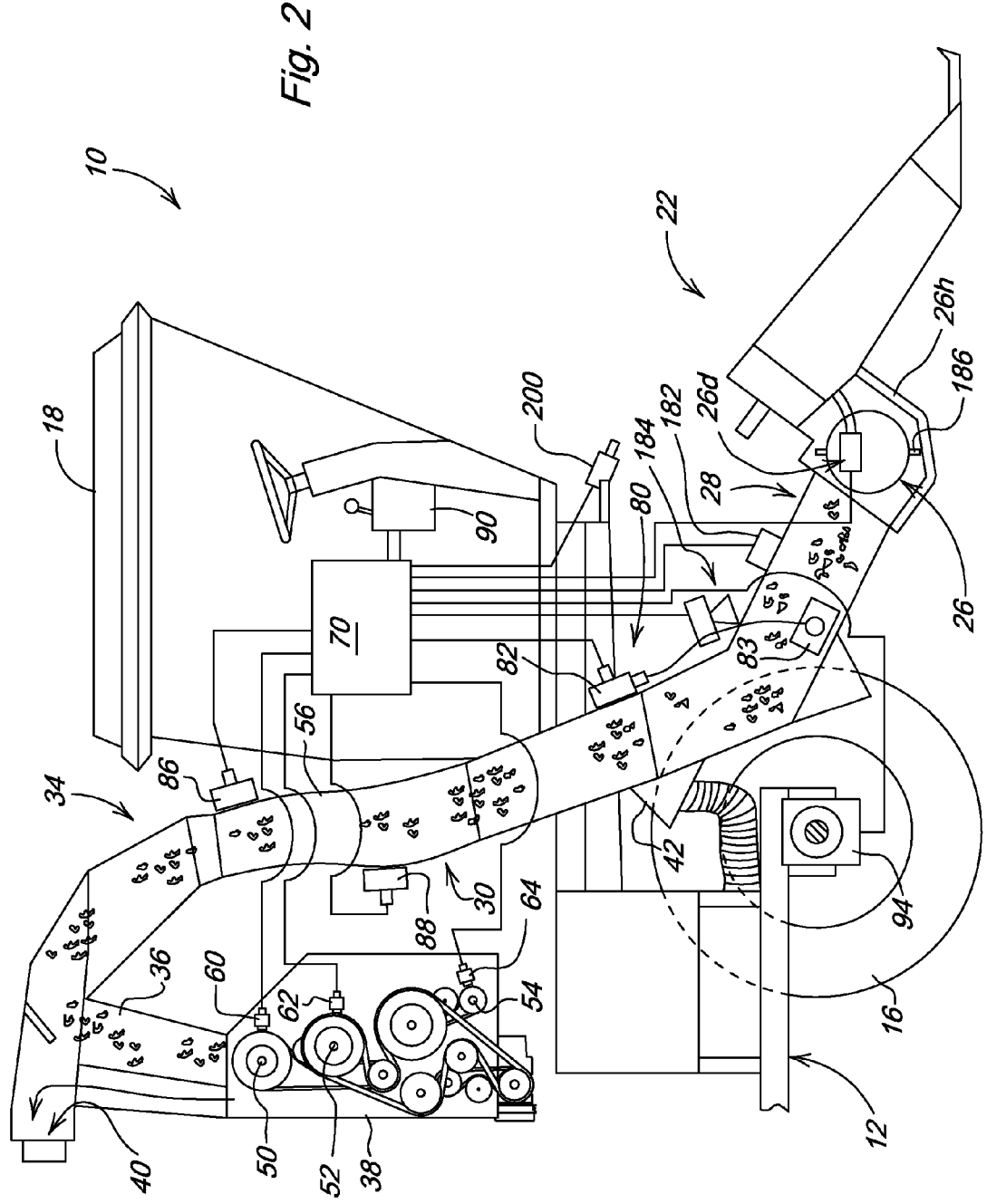

CONVEYING DUCT MONITOR SYSTEM FOR CONTROLLING HARVESTER SPEED

This application is a continuation in part of, and claims the benefit of priority of, U.S. patent application Ser. No. 10/887, 963 filed Jul. 9, 2004, assigned to the same assignee as this patent application and entitled Conveying Duct Pressure Monitor System for Controlling Harvester Speed, now U.S. Pat. No. 7,249,449. The contents of that patent application are incorporated herein by reference.

FIELD OF THE INVENTION

The present invention relates generally to an agricultural harvester having an air duct system to convey harvested material and, more specifically, to a device for controlling harvester speed dependent on the detected flow in the duct system.

BACKGROUND OF THE INVENTION

The harvesting capacity of a cotton harvester is determined by the capacity of the harvesting unit to remove the cotton from the plant and the capacity of the air system to convey the cotton downstream from the harvesting unit. If the harvester is a cotton stripper equipped with a cotton cleaner, the capacity of the cleaner to process and remove the burs and foreign material from the cotton also affects the overall machine capacity.

The operator can see when the row units are operating at or above capacity by the amount of cotton left on the stalk, and in over-speed conditions, excess cotton will remain. However, a monitor system is required for the operator to determine if the air system and cleaner are running close to capacity. Current cotton strippers have a speed sensor on the top saw of the cleaner. A readout in the cab provides top saw speed which gives the operator an indication of percent of full capacity of the cleaner. If the top saw slows below a predetermined lower speed, an audible alarm and light will be activated to warn the operator that the machine must be slowed to avoid cleaner plugging. Conversely, the readout informs the operator there is additional capacity in the cleaner so machine speed can be increased to gain productivity.

Many cotton material conveying systems include a nozzle pointed downstream in the air duct to induce a vacuum in the lower part of the duct which draws removed material upwardly. Manually adjustable vacuum switches using a spring and diaphragm are available to measure the difference in pressure between the lower portion of the air duct and the cab. When the vacuum falls below the set point as a result of duct capacity being approached or exceeded, the sensor triggers a light and audible alarm to warn the operator to decrease harvester speed. Several problems exist with present vacuum monitoring systems. First, the systems measure the vacuum relative to cab pressure, and cab pressure can vary if the cab air conditioning system blower speed is changed, the cab door is opened, or the cab inlet filter gets plugged. Any such variance requires the operator to reset the sensor for effective operation. Secondly, setting the sensor requires a trial and error approach wherein the operator increases speed until the machine plugs to see if the sensor is set correctly. If the setting is incorrect, the operator must readjust the setting to try to initiate a warning just before the duct blockage condition occurs. The third problem with the current vacuum system is inability of such a system to inform the operator when there is additional capacity available in the air system. As a result, machine productivity is compromised.

SUMMARY OF THE INVENTION

It is therefore an object of the present invention to provide an improved system for monitoring a harvester air duct system. It is a further object to provide such a system which overcomes most or all of the aforementioned problems. It is another object of the present invention to provide an improved system for monitoring a harvester air duct system which is reliable, easy to calibrate and unaffected by changes in air pressure in the cab of the harvester. It is yet a further object to provide such a system which helps the harvester operator maintain peak machine productivity and reduces incidences of the machine overload or under-capacity operation.

It is still another object of the invention to provide an improved air duct monitoring system for a cotton harvester. It is another object to provide such a system which can be utilized to maintain optimum harvester operating speed and which can be combined with a monitor for another area, such as a cleaner, to determine which area is the capacity limiting factor on the harvester and select that area monitor to control operating speed.

One system constructed in accordance with the teachings of the invention utilizes a temperature compensated differential pressure sensor to measure the vacuum in the duct relative to atmospheric pressure or to a positive pressure farther upstream in the duct. This system is the subject of our copending aforementioned U.S. Patent application Ser. No. 10/887, 963 entitled Conveying Duct Pressure Monitor System for Controlling Harvester Speed, now U.S. Pat. No. 7,249,449. The output from the pressure sensor is monitored electronically and can be displayed and/or used to optimize vehicle speed. In addition, a machine processor monitor output can be used in conjunction with the pressure sensor to control ground speed. Cleaner speed and vacuum in the air duct are monitored to determine which area of the machine is the limiting factor and to adjust harvester speed dependent on that limiting factor. The system is not affected by the variation in cab pressure. Therefore, need for resetting is reduced or eliminated, or achieved automatically. Additionally, the system continuously identifies duct vacuum to allow the operator or an automatic speed control system to adjust vehicle ground speed for optimum performance. Loading on a crop processor structure is also monitored to provide a load indication which is used to control harvester ground speed. The system allows an inexperienced person to operate the machine near maximum capacity without plugging and relieves operator stress by automatically controlling the ground speed. The operator does not have to watch the cleaner speed and vacuum as closely and has more time to monitor and control other machine functions.

In another embodiment of the invention, a sensor such as a microwave sensor monitors the velocity and mass flow of cotton in the lower air duct. As the flow of cotton in the air duct nears maximum capacity, the cotton velocity will decrease and the sensor provides a signal to the controller so that harvester speed will be reduced appropriately. Also, a moisture sensor can be added to the duct to measure the moisture level of the cotton. The inputs of moisture and cotton mass flow can then be combined to determine the percentage capacity of the cleaner. In dry cotton conditions, the capacity of the entire machine will be determined by the air system. In wetter cotton condition, capacity typically is limited by the cleaner. By determining mass flow and moisture content of the crop material in the duct, cleaner loading can be anticipated for faster response time without reliance solely on cleaner shaft speed and loading. Since cotton mass flow and moisture content are known, the controller can vary speed of the cross auger and impeller to even out the flow of cotton within the air duct system in highly variable yield conditions in the field.

An optical sensor or other crop condition sensor can also be connected to the harvester to provide an indication of crop conditions immediately forward of the row unit or header to anticipate the amount of crop material that will be entering the duct structure. A signal is provided to the operator and/or to the automatic speed control indicating an approaching potential over- or under-capacity condition to quicken harvester speed changes in response to changing crop conditions. The controller can also process the crop condition signal to determine if changing crop conditions require a harvester speed change. The combination of sensed crop material within the duct structure and anticipated crop condition facilitates a highly accurate and responsive control system for avoiding over- and under-capacity conditions both in the duct system and in the crop processor and maintains optimum productivity of the harvester.

These and other objects, features and advantages of the present invention will become apparent upon reading the following detailed description in view of the drawings.

BRIEF DESCRIPTION OF THE DRAWINGS

FIG. 2 is a view similar to FIG. 1 but showing an alternate embodiment of the invention.

DESCRIPTION OF THE PREFERRED EMBODIMENT

Figure 1:
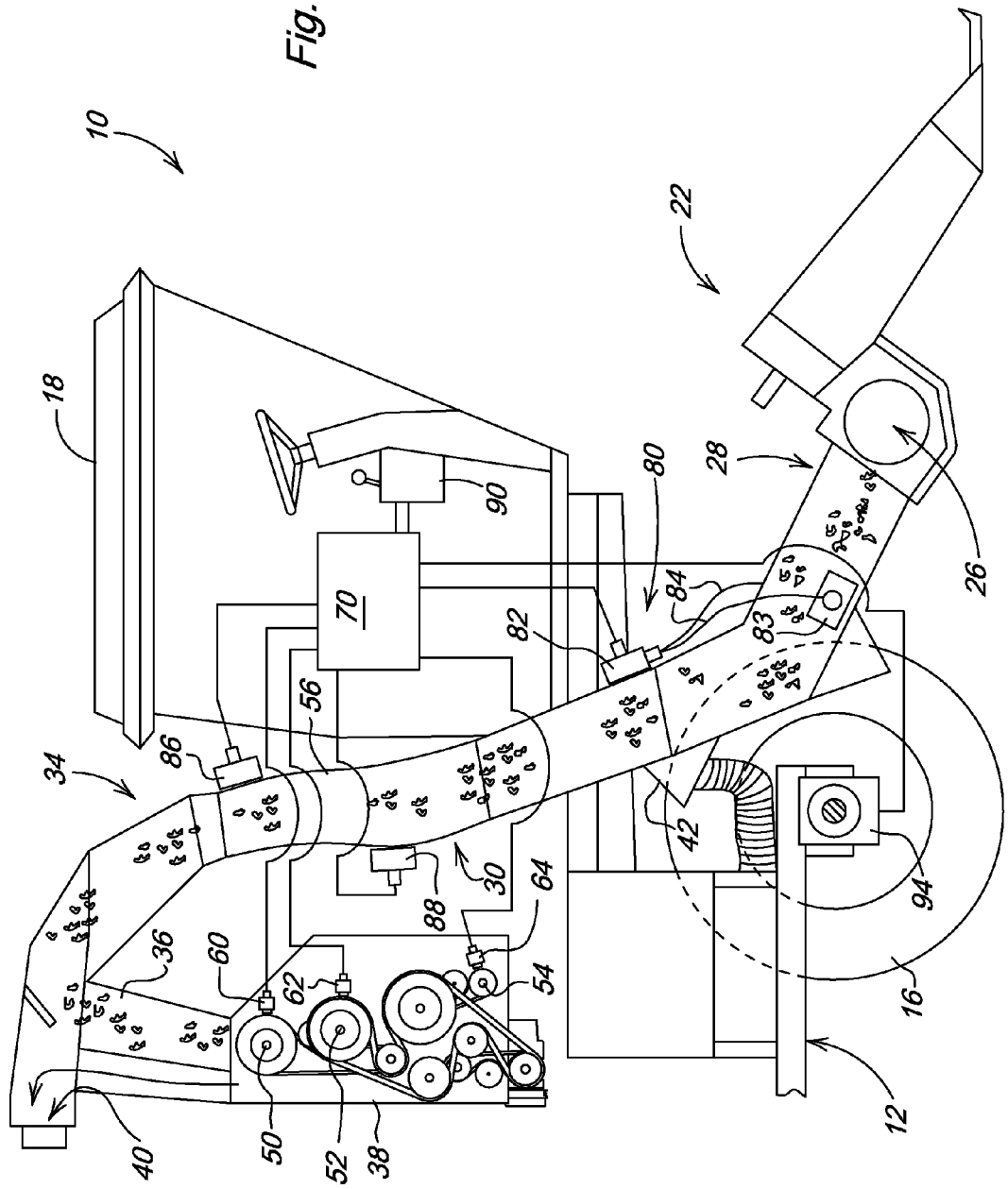
FIG. 1 is a side view of a portion of a harvester having an air duct system and a crop processing unit.

Referring now to FIG. 1, therein is shown a cotton harvester 10 having a main frame 12 supported for forward movement over the ground by forward drive wheels 16 and rear steerable wheels (not shown). A cab 18 is supported on the forward end of the frame 12. A lift frame is adjustably supported from the forward end of the frame 12 for mounting a conventional header 22 for stripping cotton material from rows of cotton plants. The header 22 includes a cross auger 26 for conveying stripped cotton and other material to a central outlet location which opens rearwardly into a separation duct 28.

Air duct structure 30 with an S-shaped configuration curves upwardly and rearwardly from the separation duct 28 to an upper separation grate area structure 34 which selectively directs conveyed material downwardly through an input duct 36 to an on-board processor such as a cotton cleaner 38 as shown in FIG. 1, or rearwardly to a basket or receptacle through an outlet area 40. The grate area 34 is supported from the frame via duct 36 and cleaner 38 and provides principle support for the duct structure 30. An air system including an air jet nozzle structure 42 in the rear of the duct structure 30 directs air upwardly and induces air flow upwardly from the duct 28 to direct cotton and other light material rearwardly and upwardly towards the grate area structure 34. Heavy materials such as green bolls drop from the stream of conveyed material through openings near the bottom of the separation duct 28 and below the grate area structure 34, while light trash exits through the grate area 34.

For further details of the duct structure 30 and separation grate area structure 34, reference may be had to U.S. Pat. Nos. 4,606,177 and 6,321,516.

The onboard processor 38 includes several drives 50, 52 and 54 with drive shaft monitors 60, 62 and 64. As shown, the drives 50, 52 and 54 provide power to feeder, primary saw, and reclaimer saw drums, and drive to an auger and cleaner fan. The shaft monitors 60, 62 and 64 provide a signal to an electronic controller 70 on the harvester indicative of loading on the drives. For example, shaft speeds can be monitored, and if the processor 38 is overloaded with an excess amount of harvested material, the shaft speed on one or more of the drives 50, 52 and 54 will slow below a preselected acceptable speed range. During field operations, the controller 70 polls the shaft monitors 60, 62 and 64 and provides an indication of processor loading and of pending or actual shaft overload conditions so the operator can slow the machine to bring loads at the processor into the desired operating ranges. In addition to detecting and warning of potential overload conditions, the processor also provides an indication of the percentage of processor utilization so that the harvester speed can be controlled to better utilize machine capacity and increase productivity.

A pressure monitor system indicated generally at 80 (FIG. 1) is provided at the duct structure 30 and is connected to the electronic controller 70. The monitor system 80 includes at least one duct pressure monitor 82 for providing pressure signals indicative of the pressure in the duct at one or more locations 83 in the duct. The pressure at the location 83 relative to atmospheric pressure outside the cab 18 is determined. The pressure monitor 82 includes a pressure input connected by tubes 84 to vacuum sensor ports at location 83 on each side of the lower portion of the duct structure 30. The monitor 82 is attached to the harvester at a protected location. As shown in FIG. 1, the port locations 83 are below the jet nozzle structure 42 in a duct area having a negative pressure relative to atmosphere during normal harvesting operations. If the duct structure 30 approaches a maximum capacity condition or a blockage begins to form, the vacuum level below the jet nozzle structure will decrease below a preselected minimum value. In one embodiment of the invention, the electronic controller 70 provides an indication of the problem so the operator can slow or stop the harvester to alleviate the duct overload or potential overload condition before a blockage occurs. The controller 70 can include a readout device, an audio or visual warning device, or a combination of devices for indicating under- and over-capacity conditions and percentage of maximum capacity usage. The pressure monitor system 80 is temperature compensated for accuracy over a wide range of operating conditions. For example, the monitor 82 can include temperature compensation to reduce or eliminate calibration requirements.

Additional pressure monitors such as shown at 86 and 88 may be added to monitor pressure at different locations in the air system on the harvester to facilitate early warning of potential problems such as overloads or blockages of the duct and provide additional diagnostic information to the operator. Pressures at the different areas are monitored by the controller 70 and compared to each other or to atmospheric pressure outside the cab 18. If a pressure reading at one of the monitors is outside of an acceptable range relative to either atmosphere or to another monitor reading, a warning is provided. The multiple pressure monitors also facilitate optimization of maximum duct structure utilization. A single pressure monitor such as the lower vacuum monitor 82 can be utilized to provide pressure signals to the controller 70 for calculating an estimated duct structure percentage of capacity utilization or other suitable capacity-related indication to display to the operator for use with the processor utilization indication to control harvester speed for optimum productivity. Comparing relative pressure readings at more than one location in the air system can reduce system warning response time and increase sensitivity for certain blockage or overload conditions. The pressure monitor system 80, in combination with drive shaft monitoring on the processor 38 to provide an indication of the shaft speed and/or loading of the processor, assures that a potential overload or blockage anywhere between the auger 26 and the outlet area 40 is timely and reliably detected. Harvester speed can be adjusted easily to maintain duct capacity usage close to the maximum duct capacity.

In a further embodiment of the invention, the controller 70 also controls machine harvest speed automatically. The controller 70 is connected to an operator speed control 90 and controls a hydrostatic transmission 94 connected to the drive wheels 16. The controller 70 is responsive to the speed control 90 and to the load indicating signals provided by one or more of the monitors 60, 62 and 64 and by the pressure monitor 82 and any additional monitors on the drive or air system. In an automatic speed control mode, the controller 70 causes the harvester to move at a speed up to the maximum speed determined by the setting of the speed control and by the capacity indications. Maximum set speed will be maintained if the capacity indications from the processor 38 and the duct structure 30 are all within acceptable ranges. However, if the controller 70 determines that a maximum capacity condition is approached or reached at either the duct structure 30 or the on-board processor 38, the controller 70 causes the harvester 10 to slow as necessary to alleviate the potential overload or blockage condition and to maintain the monitor signals within their desired ranges. If the bypass grate structure 34 is moved to bypass the processor 38 so harvested material is propelled directly from the duct structure 30 through the outlet area 40 into the basket, the controller 70 in the automatic speed control mode adjusts harvester speed up to the maximum speed set by the control 90 and assures that maximum duct capacity is not exceeded. The controller 70 can provide an indication to the operator when both the processor and duct capacities are consistently below maximum allowable so that the setting of the upper limit set by speed control 90 can be increased if field conditions permit.

Referring now to FIG. 2, another embodiment of the invention is shown including a control system 180 having a conveyed material sensor 182 providing a material mass flow signal to the controller 70 indicative of the velocity and mass of the material within the air duct system. Measuring speed or velocity rather than pressure is often easier and more reliable and provides more resolution than use of a pressure signal only. The speed control 90 is responsive to the material mass flow signal from the sensor 182 for controlling the forward speed of the harvester to operate the air duct system and the crop processor generally at or below the maximum capacity. As the flow of the harvested material in the duct structure 30 approaches the maximum capacity of the duct the velocity of the material will decrease. Therefore, when the controller 70 detects a slowing of the material in the duct structure 30, the controller provides a duct capacity warning to the operator and/or automatically slows the harvester 10 so that material velocity in the duct is maintained at or above a lowermost acceptable value.

A moisture sensor system 184 provides a signal indicative of the moisture content of the material in the air duct structure 30. The moisture sensor system 184 may be generally of the type commonly used in gins, such as the microwave bale moisture sensor manufactured by Vomax of Australia. The controller 70 monitors the output signals from the sensors 182 and 184 and provides an indication of mass flow and moisture of the material flowing through the duct structure 30. The processor 38 has a maximum capacity that is dependent both on material mass and material moisture content. Based on the signals provided by the material sensor 182 and the moisture sensor system 184, the controller 70 predicts the loading that will be encountered by the processor 38 before the detected material actually reaches the processor. Therefore, the control system can react more quickly than a system that relies solely on measured shaft speed or shaft loading of the processor 38.

The sensor 182 is of conventional construction, for example, of the type shown in commonly assigned U.S. Pat. No. 6,606,571 entitled MICROWAVE FLOW SENSOR FOR A HARVESTER. The microwave sensor 182 is located outside a lower portion of the duct system 30, and the mounting duct portion is fabricated from a material such as plastic that is generally transparent to microwaves. The microwave sensor is aimed in the forward direction to measure material velocity. Alternatively, the sensor 182 can be aimed in the rearward direction. Other types of speed and velocity sensors may also be used for determining material conveying speed, including a Doppler type of system shown, for example, in commonly assigned U.S. Pat. No. 5,063,729 entitled COTTON HARVESTER BLOCKAGE DETECTION METHOD AND FLOW SENSOR THEREFOR. Although the moisture sensor system 184 is shown as a separate unit, moisture sensing can be integrated into the microwave sensor 182.

As shown in FIG. 2, the cross auger 26 is driven by a variable speed drive 26d controlled from the controller 70 to provide a variable speed delivery system for controlled delivery of harvested crop material from the header or row unit 22 to the duct structure. For example, in field conditions wherein the crop yield is highly variable over short distances, the auger 26 can be momentarily slowed to alleviate a short-term over-capacity condition in the duct structure 30. When the controller 70 receives a signal from the material sensor 182 indicating a slowing of material within the duct, the auger 26 is immediately slowed to decrease the amount of material in the duct structure 30. In quickly changing crop conditions, the speed of the harvester 10 may not have to be slowed at all and, once the higher yield area is passed, the auger can be returned to normal operating speed. If the over-capacity condition is more long-term, the controller will decrease the harvester speed and readjust auger speed for optimum productivity.

The variable speed delivery system can also include a variable speed impeller such as shown at 186 is FIG. 2. When an over-capacity condition is indicated in the duct structure 30, the controller 70 reduces the drive speed of the impeller 186 to reduce the amount of material entering the duct. If the over-capacity condition is alleviated during the momentary slowing of the impeller 186, the controller will return the impeller to normal operating speed. The auger and impeller housing (26h) provides a small accumulator function adjacent the auger and impeller and receives any excess harvested material not delivered to the air duct system during the momentary slowing of the auger and/or impeller. As shown, the auger 26 and impeller 186 are driven in unison, but separate drives can also be provided to adjust impeller speed and auger speed independently of one another.

A sensor 200 such as a camera or other suitable crop condition detecting device is connected to the harvester to provide an indication of crop conditions immediately forward of the row unit or header 22. For example, the sensor 200 is shown as a camera, and the ratio of white pixels to non-white pixels is processed to provide an indication of cotton crop density. Alternatively, an acousto optical tunable filter (AOTF) may be employed to look for a particular color and increase processing efficiency. The sensor 200 provides a crop signal to the controller 70 to anticipate the amount of crop material that will be entering the duct structure 30. A signal is provided to the operator and/or to the automatic speed control indicating an approaching potential over- or under-capacity condition to quicken harvester speed changes in response to changing crop conditions. The controller 70 can also process the crop condition signal to determine if changing crop conditions require a harvester speed change. For example, if the crop material speed within the duct structure 30 begins to slow but the crop signal indicates there is an approaching decrease in crop density, the controller 70 can temporarily slow the variable speed delivery system rather than slow the harvester 10. The changing crop condition signal can also be provided by incorporating a load sensor in the header/row unit drive or cross auger drive 26*d* and sensing the load on the drive. Also, changing crop conditions signals can be provided by optically or acoustically detecting the crop level within the auger and/or impeller housing. The combination of sensed crop material speed within the duct structure 30 and anticipated crop condition facilitates a highly accurate and responsive control system for avoiding over- and under-capacity conditions both in the duct system and in the crop processor and maintains optimum productivity of the harvester 10. The addition of moisture sensing in the duct further enhances the speed and accuracy of the response to prevent overload or under-capacity conditions in the processor 38. Although the processor is shown as a cotton cleaner, it is to be understood that other crop processing structures may be utilized with the above-described control system.

Having described the preferred embodiment, it will become apparent that various modifications can be made without departing from the scope of the invention as defined in the accompanying claims.

The invention claimed is:

1. A control system for a harvester having drive wheels coupled for being driven by a variable speed transmission and having a harvesting unit for removing crop material from a field, an upstream conveyor for receiving the removed crop material directly from the harvesting unit, and an air duct system mounted for receiving crop material directly from said upstream conveyor and for propelling the removed crop material away from the upstream conveyor, a harvested material processor coupled for receiving crop material from the air duct system, the air duct system having a maximum material conveying capacity and the harvested material processor having a maximum processing capacity dependent upon crop material mass and moisture content, the control system including a conveyed material sensor arrangement mounted for sensing the flow and moisture content of the material in said air duct system and providing a material flow signal indicative of the speed of the material within the air duct system and a material moisture content signal indicative of the moisture of the material in the air duct system, an electronic controller coupled for receiving said material flow and material moisture content signals, and being coupled to said variable speed transmission, with the electronic controller being responsive to said material speed and moisture content signals to provide advanced mass flow information for anticipation of conditions the crop material processor will be encountering and being responsive to at least one of the material flow signal and advanced mass flow information for controlling forward ground speed of the harvester, to cause at least one of the air duct system and material processor to operate generally at or below the maximum material conveying capacity of the air duct system or the maximum processing capacity of the processor.

2. The control system as set forth in claim 1 wherein the conveyed material sensor arrangement includes a mass flow sensor.

3. The control system as set forth in claim 2 wherein the mass flow sensor comprises a microwave sensor.

4. The control system as set forth in claim 2 wherein said conveyed material sensor arrangement includes a microwave sensor for sensing said conveyed material moisture content and for providing said moisture signal indicative of the moisture content of the conveyed material in the air duct system.

5. A control system for a harvester having drive wheels coupled for being driven by a variable speed transmission and having a harvesting unit for removing crop material from a field, an upstream conveyor for receiving the removed crop material from the harvesting unit, and an air duct system for propelling the removed crop material away from the upstream conveyor towards a harvested material processor, the air duct system having a maximum material conveying capacity and the harvested material processor having a maximum processing capacity dependent upon crop material mass, the control system including a conveyed material sensor providing a material flow signal indicative of the speed of the material within the air duct system, a harvester speed control including an electronic controller coupled to said variable speed transmission and to said material flow signal and being responsive to the material flow signal for controlling the variable speed transmission to thereby control the forward speed of the harvester to cause the air duct system to operate generally at or below the maximum material conveying capacity of the air duct system, the upstream conveyor including a variable speed drive, said electronic controller being coupled to said variable speed drive and being responsive to the material flow signal to control the variable speed drive so as to vary the rate of delivery of the material from the upstream conveyor to the air duct system to even out flow of material in the air duct system when the harvester is operating in a field with variable crop conditions.

6. The control system as set forth in claim 5 wherein said upstream conveyor includes an auger located between the harvesting unit and the air duct system, and said variable speed drive being coupled for driving said auger.

7. The control system as set forth in claim 5 wherein said upstream conveyor includes an impeller located between the harvesting unit and the air duct system, and the variable speed drive being coupled for driving said impeller.

8. The control system as set forth in claim 6 wherein the auger includes an auger housing defining an accumulator for receiving harvested material when the rate of delivery is reduced.

9. A control system for a harvester having a harvesting unit for removing crop material from a field, an upstream conveyor for receiving the removed crop material from the harvesting unit, and an air duct system for propelling the removed crop material away from the upstream conveyor towards a harvested material processor, the air duct system having a maximum material conveying capacity and the harvested material processor having a maximum processing capacity dependent upon crop material mass and moisture content, the control system including a conveyed material sensor providing a material flow signal indicative of the speed of the material within the air duct system, a harvester speed control responsive to the material flow signal and controlling forward speed of the harvester, whereby the forward speed is controlled by the harvester speed control to cause the air duct system to operate generally at or below the maximum material conveying capacity of the air duct system, the upstream conveyor including a variable speed drive, said electronic controller being coupled to said variable speed drive and being further including an optical sensor connected to the harvester so as to view crop immediately forwardly of the harvesting unit and for providing a crop signal indicative of crop density immediately forward of the harvesting unit, said crop signal being coupled to said electronic controller and wherein the electronic controller is also responsive to the crop signal to provide advanced mass flow information for anticipation of the amount of crop material the processor will be encountering.

10. A control system for a harvester having drive wheels coupled for being driven by a variable speed transmission and having a harvesting unit for removing crop material from a field, an upstream conveyor coupled for receiving the removed crop material directly from the harvesting unit, and an air duct system coupled for receiving crop material directly from the upstream conveyor for propelling the removed crop material away from the upstream conveyor towards a harvested material processor coupled for receiving crop material from the air duct system, the air duct system having a maximum material conveying capacity and the harvested material processor having a maximum processing capacity dependent upon crop material mass and moisture content, the control system including a conveyed material sensor arrangement providing a material flow signal indicative of the speed of the material within the air duct system and for providing a moisture signal indicative of the moisture content of the material within the air duct system, an electronic controller coupled for receiving said material flow signal and said moisture signal, being responsive to the moisture signal to provide advanced mass flow information for anticipation of conditions the crop material processor will be encountering and being coupled for controlling said variable speed transmission in response to the material flow signal and said moisture signal for controlling said variable speed transmission for thereby controlling forward speed of the harvester, whereby the forward harvester speed is controlled to cause the air duct system and harvested material processor to operate generally at or below the maximum material conveying and processing capacities, and including means for varying rate of delivery of the material from the upstream conveyor to the air duct system to even out flow of material in the air duct system when the harvester is operating in a field with highly variable crop yield conditions.

11. The control system as set forth in claim 10 wherein the conveyed material sensor comprises a mass flow sensor.

12. The control system as set forth in claim 11 wherein the mass flow sensor comprises a microwave sensor.

13. The control system as set forth in claim 12 wherein the microwave sensor also serves as said moisture sensor.

14. The control system as set forth in claim 10 wherein the means for varying rate of delivery of the material from the upstream conveyor to the air duct system includes a variable speed conveyor drive, and said electronic controller being connected to said variable speed conveyor drive and responsive to the material flow signal for controlling the speed of said conveyor.

15. The control system as set forth in claim 14 wherein means for varying rate of delivery of the material from the upstream conveyor to the air duct system includes a variable speed auger located between the harvesting unit and the air duct system.

16. The control system as set forth in claim 14 wherein the means for varying rate of delivery of the material from the upstream conveyor to the air duct system includes a variable speed impeller.

17. The control system as set forth in claim 15 wherein the variable speed auger includes an auger housing defining an accumulator for temporarily accumulating harvested material when the rate of delivery is reduced.

18. The control system as set forth in claim 17 including a crop condition sensor located for sensing crop level in said auger housing and being connected to the electronic controller and providing a crop signal indicative of the sensed crop level, and wherein the electronic controller is also responsive to the crop signal for controlling at least one of the rate of delivery of said upstream conveyor and the forward harvester speed.

* * * * *